Patented Nov. 6, 1951

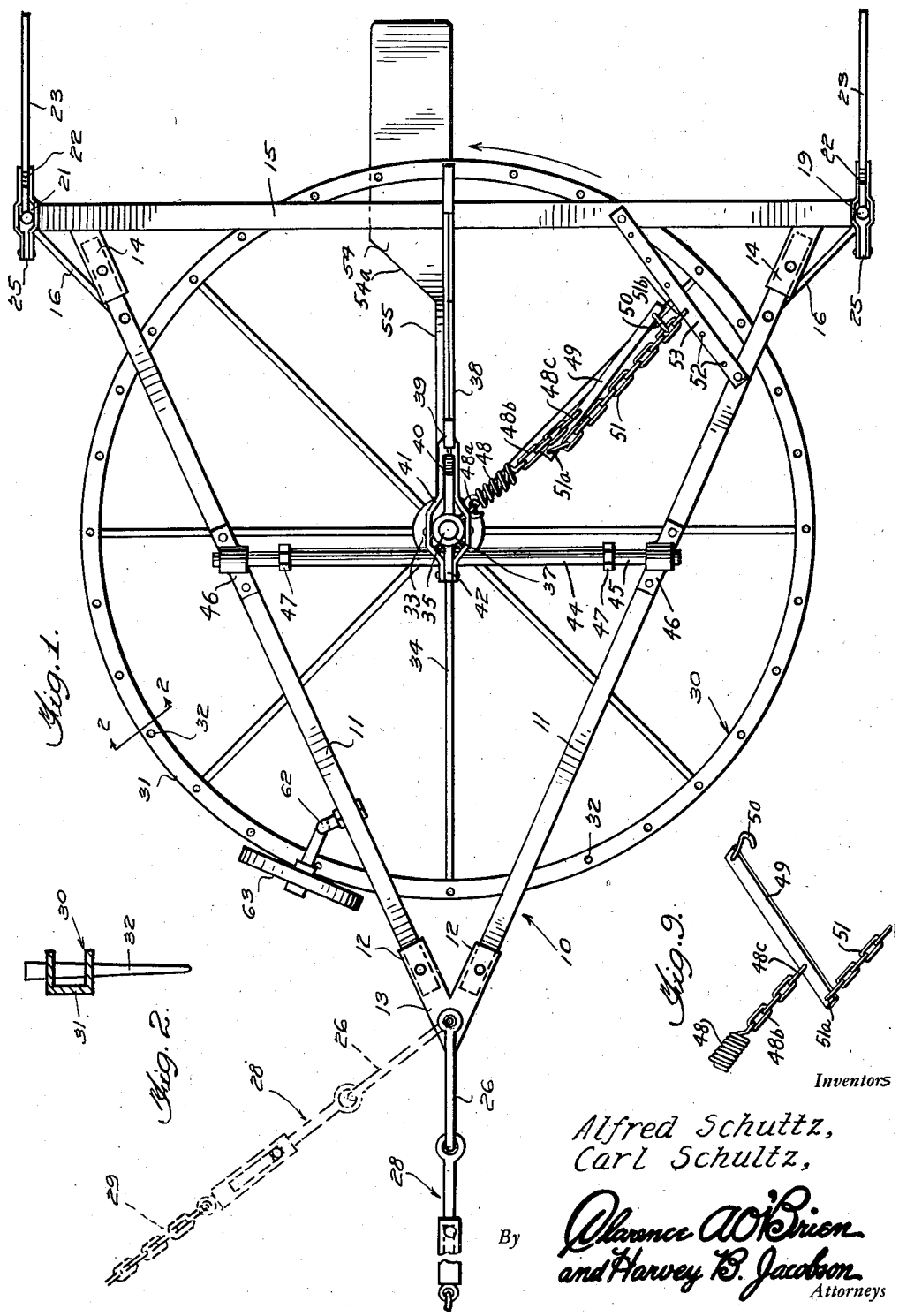

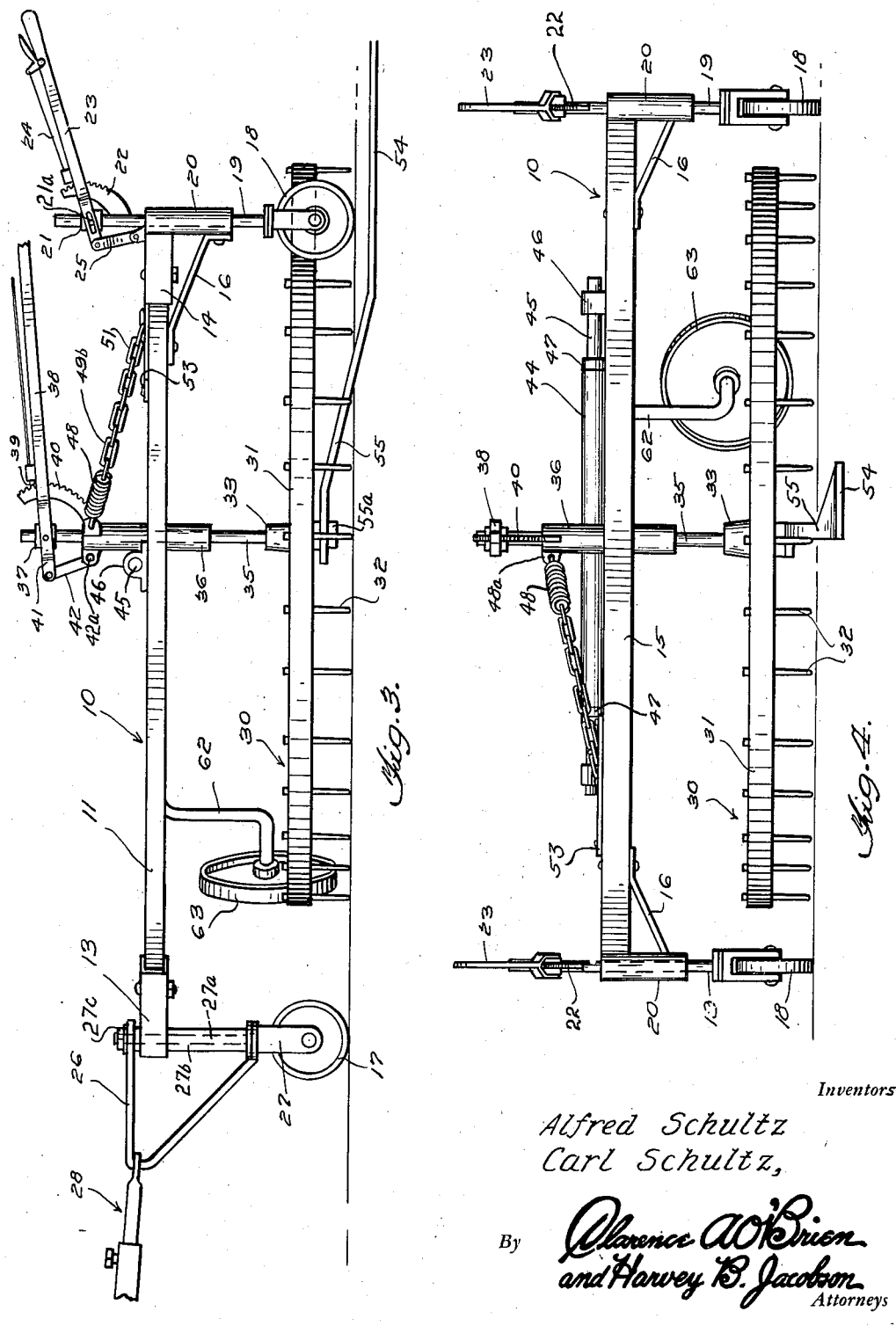

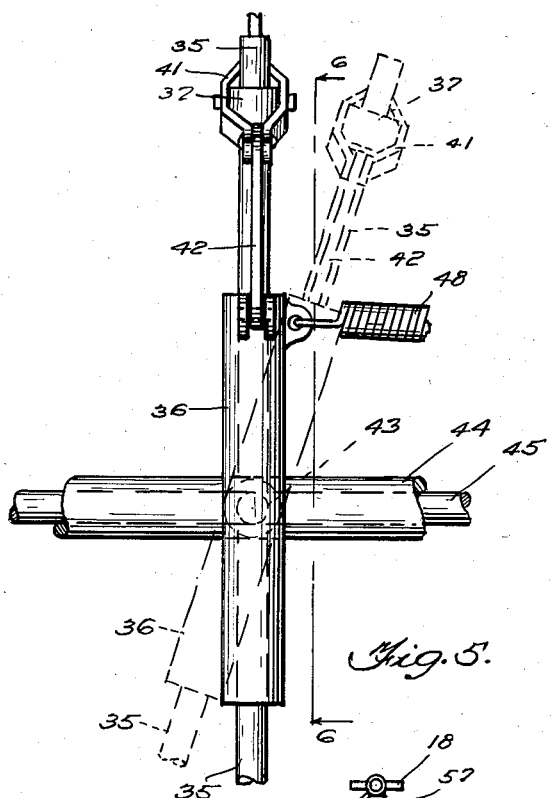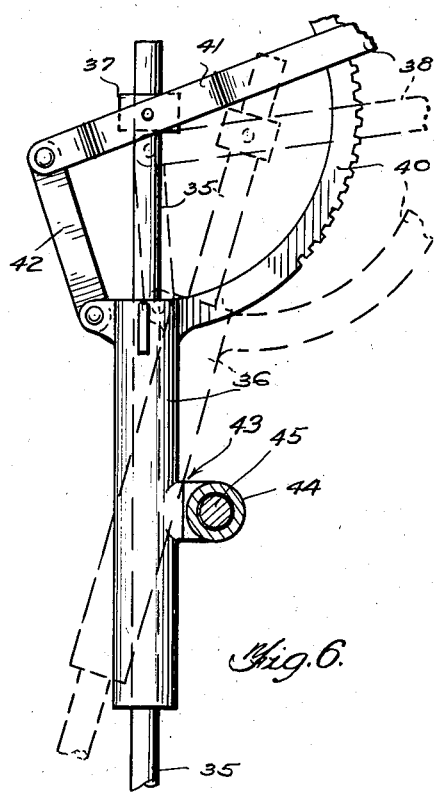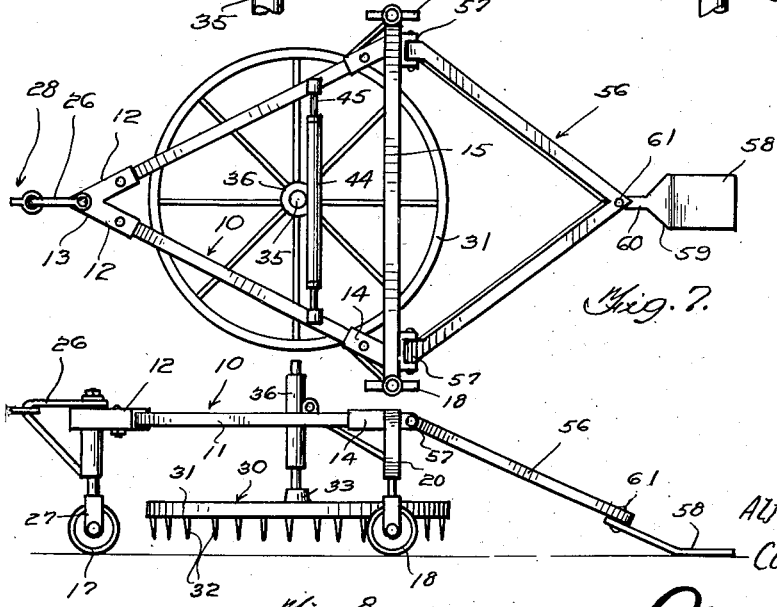

2,573,992

UNITED STATES PATENT OFFICE 2,573,992

WHEELED ROTARY STRAW MULCHER

Alfred Schultz and Carl Schultz, Upham, N. Dak.

Application July 2, 1945, Serial No. 602,782

9 Claims. (Cl. 55—20)

This invention relates generally to improvements in farm implements and more specifically to a machine for forming a so-called "trashy" mulch of straw or other vegetation upon the ground as it is plowed.

The present application is a continuation-in-part from our prior and co-pending application, Serial No. 550,596, filed August 22, 1944, and now United States Patent No. 2,381,005, issued August 7, 1945.

Modern farming methods require the use of some means to prevent soil erosion and blowing, particularly where the soil is light or sandy, in order to prevent as far as possible any further loss of the precious top soil. Farmers are accordingly changing from the dust mulch previously so widespread in use, and which permitted much erosion and blowing of the soil, to a "trash" or vegetation mulch wherein straw and other vegetation is spread upon the plowed soil. Such material when properly spread is found to break up and diffuse the rain as it falls, preventing erosion, and in effect to anchor the soil preventing it from blowing. Prior to the provision of our machine, no effective way had been devised to properly spread the straw or other vegetation but in accordance with our invention as exemplified herein, and in our patent, we provide a wheel borne frame with a rotary rake, which frame may be drawn along behind the plow breaking the field, and in such manner that the rake will tear loose and gather vegetation from the field and distribute it evenly out over the plowing. Thus, the mulching operation may be carried out along with the plowing, seeding and other operations, leaving the field in best possible condition for conserving the soil, with but little if any extra effort on the part of the farmer. Other advantages of this type of machine will be understood by those skilled in and who follow the modern trends in farming.

The primary object of the present invention is to provide certain improvements in rotary rakes or spreaders of this type designed to facilitate construction and operation thereof and including as a very important feature, a trailing shoe member adapted and arranged to travel in the furrow formed by the pulling plow in such position that that portion of the rake which delivers the straw and other vegetation to the plowing will operate immediately over the shoe. In action, this shoe then prevents the mulcher material from falling into the furrow and insures that the material will be delivered out evenly over the plowing.

Another object of the present invention is to provide an improved frame construction and arrangement for an implement of this kind and with adjustments for raising and lowering the frame and the rake and tensioning the latter to thus adjust the implement to work under all conditions.

These and other more detailed and specific objects will be disclosed in the course of the following specification, reference being had to the accompanying drawings, in which—

Fig. 1 is a top plan view of a rotary mulcher constructed in accordance with the present invention.

Fig. 2 is a cross-section taken approximately along the line 2—2 in Fig. 1.

Fig. 3 is a side elevational view of the machine.

Fig. 4 is a rear end elevation of the spreader.

Fig. 5 is an enlarged detail elevational view showing the adjustable mounting means for the rotary rake shaft or axle.

Fig. 6 is a section and side elevation taken along the line 6—6 of Fig. 5.

Fig. 7 is a top plan view on a smaller scale showing the trailing-type shoe attachment which is utilized to facilitate handling of the rake on inclines and hillsides.

Fig. 8 is a side view of the mulcher of Fig. 7.

Fig. 9 is a detail perspective view of the tensioning means for the rake in a partially released position.

Referring now more particularly and by reference characters to the drawing, our improved straw or vegetation spreader or mulcher comprises a main frame designated generally at 10, which is triangular in shape as viewed from above and comprises forwardly converging side members 11 and a transversely extending rear member 15. A V-shaped forward connecting member 13 is provided and has rearwardly opening sockets into which the forward ends of the side member 11 may be inserted and removably held by pins or bolts as clearly shown. A short distance inwardly from its extremities the rear frame member 15 has forwardly opening sockets 14 similarly mounting the rear ends of the side members 11 and it will be noted that this arrangement permits the frame to be readily disassembled for storage or shipment. Preferably, the frame parts are fabricated from tubing or angle iron of stock materials and dimensions. Upright tubular bearings 20 are rigidly secured to and depend from the rear corners of the frame and these bearings are rigidly braced by angular braces 16 bolted to adjacent rear end portions of the side members 11.

This main frame assembly is supported for travel movement by a front wheel 17 and wide spread rear wheels 18 positioned at the corresponding corners of the frame. The rear wheel assemblies are identical and in each case the wheel 18 is journaled in a fork secured to the lower end of a shaft 19 which is slidably mounted up through the adjacent bearing 20 and projects for some distance thereabove. A collar 21 is mounted upon the upper portion of the shaft 19 and a hand lever 23 is fulcrumed on the collar as indicated at 21ª. The hand lever 23 extends in a generally rearward direction and at its forward end, ahead of the shaft 19, the lever is pivotally connected to a link 25 which in turn is pivoted at its lower end to an adjacent part of the frame. The hand lever 23 has a conventional latch and pawl mechanism 24 which cooperates with an arcuate toothed quadrant or rack 22 to hold the lever in any vertically adjusted position and it will be readily understood that by moving the lever in a downward direction, the shaft 19 will be moved downwardly with respect to the bearing to raise the adjacent corners of the frame with respect to the wheel 18 and vice versa.

The front wheel 17 is journaled in a fork 27 having a shaft 27ª journaled up through a bearing sleeve 27ᵇ which is secured through and depends from the frame fitting 13. A draft yoke 26 has its rear ends pivotally mounted upon the shaft 27ª above and below the bearing 27ᵇ, and, as will be noted, a nut 27ᶜ on the upper end of the shaft holds the wheel assembly against downward displacement should the front end of the frame be raised. A draft device is designated generally at 28 and may be a part of or attached to the conventional plow (not shown), and preferably there will be embodied in such draft device a flexible chain 29 which will allow the straw spreader to trail the plow without difficulty. Any other suitable draft connection may, of course, be used as found most suitable.

The mulcher itself takes the form of a large circular rake, which is designated generally at 30, and which is positioned below and supported by the frame 10; being of such diameter as to nicely clear the respective supporting wheels 17 and 18. The rake has a circular rim 31 of channel shaped cross-section, as shown in Fig. 2, and has removably mounted depending and downwardly tapering rake or harrow teeth 32. The rake further has a centrally located hub 33 which is connected to the rim by spokes 34 and this hub is supported on the lower end of an upright rake axle 35 which is both rotatably and vertically slidably mounted through a supporting bearing sleeve 36. The connection between the sleeve 36 and the frame 10 will presently be described, but it will here be noted that the upper end of the axle 35 extends some distance above the sleeve and mounted upon this upper portion of the axle is a collar 37 to which is fulcrumed the forward end portion of a hand lever 38. The hand lever 38 extends rearwardly for manipulation from the rear of the implement and the forward end of the lever is pivotally attached to a link 42 which extends downwardly and is pivotally mounted to lugs 42ª on the upper forward portion of the bearing sleeve 36. A toothed quadrant or rack 40 is rigidly secured to the upper rear portion of the sleeve 36 and cooperating with this quadrant is a latch actuated pawl 39 by which the hand lever may be locked in any adjusted position. It will be readily evident that this arrangement is such that downward movements of the hand lever 38 will correspondingly adjust the working level of the rake 30 with respect to the main frame and to the ground. It will further be understood that the collar 37 is rotatably engaged with the axle 35 and it may be held in any conventional manner against axial displacement with respect to the axle.

A bearing sleeve 36, as best shown in Fig. 5, is attached by a horizontal and longitudinally extending pivot connection 43 to a tubular mounting sleeve 44. The sleeve 44 is oscillatably mounted upon a transversely extending shaft 45, the ends of which are attached by bearing brackets 46 to the main frame side members 11. This mounting provides for tilting movements of the rake 30 in upright planes about both transverse and longitudinal axes, as will be readily understood, and in addition, the sleeve 44 may be adjusted in transverse directions to center the rake with respect to the main frame and may be locked in any adjusted position against endwise displacement by collars 47 having set screws for engaging the shaft 45. It will be noted that the shaft 45 is positioned some distance forwardly of the rear frame member 15 so that the circular rake 30 is substantially centered with respect to the fore and aft dimensions of the frame. This not only provides for the maximum of compactness with respect to the diameter of the rake, but more evenly locates the three wheels 18 and 18 about the periphery of the rake.

The axis of the rake 30 is tilted rearwardly and to the left or landward side, as viewed from the rear, and yieldably biased in this direction by a retractile coil spring 48 attached at 48ª (Fig. 4) to the upper end of the rake bearing sleeve 36 and stretched therefrom toward the rear corner of the frame 10. It will further be noted that the shaft 45 is located forwardly of the rake axle 35. Thus, the rake as a whole is so supported that should the tensioning means (later to be described) break or otherwise fail the rake will of its own weight tilt rearwardly and its rear edge can then drag along without damage. This would not be true, of course, if the shaft 45 were behind the axle 35 in which case the rake would drop at its forward edge tending to dig into the ground and cause damage.

The end of the spring 48 is connected to a short length of chain 48ᵇ which at its end has a hook 48ᶜ by which it is connected adjacent one end of a tensioning bar 49. Adjacent this connection another chain 51 is connected at 51ª to the end of the bar 49 and this chain has a hook 51ᵇ which may be engaged with any one of a series of apertures 52 is a keeper bar 53 secured across the left rear corner of the frame. The opposite end of the bar 49 carries a hook 50. The arrangement is such that the bar 49 will have a toggle-like action to stretch the spring 48 when it is swung to the position of Fig. 1 and the bar may be held in such position by engaging the hook 50 with the chain 51 as clearly shown. On the other hand, the hook 50 may be readily disengaged from the chain 51 and the bar swung to and beyond the position of Fig. 9 and the tension on the spring will then be released. The actual tension applied may be varied by varying the effective length of the chain 48ᵇ.

The tension thus applied to the rake will tilt its rear and left or landward portion downward to engage the material on the field, causing the rake to rotate and at the same time rake up the material and carry it along over onto the plowing. The series of apertures 52 for the attachment of the tensioning mechanism to the frame enables the angle at which the tension is applied to the rake to be readily varied, so that the rake may be tilted more or less to the side according to the nature of the vegetation and material on the field being plowed.

It will be observed that the last furrow formed by the plow will pass along beneath approximately the center of the rake 30 as the implement follows the plow and to keep the straw from dropping in large part into the furrow, instead of being carried and spread out over the plowing as is desired, we provide a furrow shoe 54 which is connected at its forward end through a drag bar portion 55 to a lower end of the rake axle 35 by means of a collar 55a. The arrangement is such that the furrow shoe may trail freely and the connection to the axle is that what is known as a "sloppy fit" thus allowing the shoe to swing and tilt from side to side as necessary to stay in the furrow. The drag bar 55 angles rearwardly and downwardly as seen in Fig. 3 so that the furrow shoe hangs well below the level of the rake and may run along the bottom of the furrow. The forward end of the shoe, on the side opposite the furrow wall, is tapered forwardly as seen at 54a in Fig. 1. In action, as the furrow shoe slides forwardly along the furrow the vegetation or straw will quickly pile up on the shoe to about the level of the top of the furrow and thus the material moving across with the rake will be carried readily out over the plowing by the rake, without any tendency to fall into the furrow. In this connection, it will be noted that the shoe is located immediately below the rear part of the circular rake rim 31, or at the point where the rake teeth 32 move out over the furrow to spread the material out to the plowing and thus the traveling material on the shoe will "plug" or level the furrow at the required point to keep the material from dropping into the furrow and being plowed under on the next trip around the field. The "sloppy" fit of the drag bar allows the shoe to wobble enough to drop off most of the dirt that falls upon it.

Reference being had now to Figs. 7 and 8, it will be seen that 56 designates an auxiliary V-shaped trailer member which is hinged, as at 57, to the rear member 15 of the main frame. This member 56 extends downwardly and rearwardly and a furrow shoe 58 in the form of a rectangular plate having a reduced wedge-shaped end 59 and a shank 60 is pivotally connected at 61 to the rear end of the member. This shoe 58 being carried by the trailer member 56 to the rear of the implement will permit the machine to be properly operated on inclines and hillsides as will be readily understood.

To clear the rake teeth of accumulated debris, we provide an axle shank 62 which is secured to the right hand side member 11, well forwardly thereon, and which has an end upon which is journaled a cleaver wheel 63. The wheel is so positioned as to extend down tangentially to the outer edge of the rake rim 31 well below the same so that accumulated straw etc. between or on the teeth 32 will strike the wheel and will be forced thereby down off the teeth as will be readily understood.

We claim:

1. A portable rotary rake of the class described comprising a horizontally disposable substantially triangular frame structure, ground contacting and supporting wheels for said frame structure, a rotary rake mounted on and carried by said frame structure, the latter structure comprising a pair of diverging frame members, a V-coupling connecting the converging ends of said frame members, and a rear cross member, said cross member being provided with sockets, the rear adjacent ends of said first-named frame members being removably mounted in said sockets, and said wheels being removably mounted on said frame structure, whereby to permit said structure to be dismantled and knocked down for compactness, convenience, and shipping and storage.

2. In a rotary straw rake of the class described, a wheel-supporting frame, a rod mounted on said frame, a tubular member mounted on said rod, a vertical sleeve hingedly mounted on the intermediate portion of the tubular member, an axle slidably and adjustably mounted in said sleeve, a rotary circular toothed rake having a hub connected to the lower end of said axle, and manually regulated adjusting means for the axle comprising a lever connected to the axle, a pawl on said lever, and a rack on said sleeve.

3. The combination with a traveling mulcher of the character described and including a moving member operative to rake vegetation from the ground as furrows are plowed therein and deliver the material to the plowing, of a furrow shoe arranged beneath the said moving member to run in the furrow and divert the material onto the plowing and prevent the same from accumulating in the furrow.

4. In an implement of the character described, a wheel borne frame, a rotary rake carried by the frame and operative as ground is plowed ahead of the implement to rake vegetation material from the ground out over the plowing, and a member carried by the implement to run in the landward furrow at the point at which the material is raked across that furrow out onto the plowing and to guide the material so that it will not fall into the furrow.

5. In an implement of the character described, a wheel borne frame, a rotary rake carried by the frame and operative as ground is plowed ahead of the implement to rake vegetation material from the ground out over the plowing, and a furrow shoe connected to the implement to travel along the landward furrow and gather and carry along an accumulation of material across which the raked material may pass to the plowing without falling into the furrow.

6. In a farm implement which includes a wheel borne frame adapted to follow a plow over the ground and having a rotary circular rake extending in part out over the plowing and operative to rake mulching material from the ground and spread it over the plowing, the improvement which consists in a shoe member positioned to travel along in the last made furrow beneath the point at which the rake carries the material out over the plowing, and said shoe member being operative to gather material on it as it travels and build up such material approximately to the top of the furrow.

7. In a farm implement for forming a trashy mulch and which includes a wheel borne frame adapted to follow a plow over the ground and having a rotary circular rake extending in part out over the plowing and operative to rake mulching material from the ground and spread the material out over the plowing, the improvement which consists in a shoe member positioned to travel along in the last made furrow beneath the point at which the rake carries the material out over the plowing, and said shoe member being flexibly connected to the implement to trail in and follow the furrow.

8. In an implement of the character described, a wheel borne frame, a horizontal transverse pivot support, a rotary rake having an upright axle, a bearing for the axle, and said bearing being pivoted to said pivot support forwardly thereof and for swinging movements about a fore axis whereby the rake may be tilted about two substantially horizontal and angularly related axes with respect to the frame.

9. In an implement of the character described, a wheel borne frame, a bearing member supported on the frame for tilting movements in an upright plane, a rotary circular rake having an axle journaled and supported in said bearing member, and means for yieldably tilting the bearing member to move a portion of the rake into engagement with the ground, said last mentioned means including a spring and a connection between one end of the spring and the frame, and means for adjusting the connection between the spring and frame to vary the angle at which the rake is tilted.

ALFRED SCHULTZ.
CARL SCHULTZ.

REFERENCES CITED

The following references are of record in the file of this patent:

UNITED STATES PATENTS

| Number | Name | Date |
|---|---|---|
| 353,234 | Ruef | Nov. 23, 1886 |
| 440,178 | Monroe | Nov. 11, 1890 |
| 1,253,307 | Tveten | Jan. 15, 1918 |

FOREIGN PATENTS

| Number | Country | Date |
|---|---|---|
| 69,803 | Germany | July 19, 1893 |
| 288,308 | Italy | Sept. 3, 1931 |
| 390,273 | Great Britain | Apr. 6, 1933 |